United States Patent [19]

Powers et al.

[11] Patent Number: 4,892,205
[45] Date of Patent: Jan. 9, 1990

[54] CONCENTRIC RIBBED PREFORM AND BOTTLE MADE FROM SAME

[75] Inventors: Thomas F. Powers, Ypsilanti; William G. Kinslow, Saline, both of Mich.

[73] Assignee: Hoover Universal, Inc., Ann Arbor, Mich.

[21] Appl. No.: 219,731

[22] Filed: Jul. 15, 1988

[51] Int. Cl.$^4$ .......................... B65D 1/02; B65D 23/00
[52] U.S. Cl. ........................ 215/1 C; 220/70; 428/36.92; 428/542.8
[58] Field of Search ................... 215/1 C; 220/69, 70, 220/72; 428/35, 542.8, 35.7, 36.92

[56] References Cited

U.S. PATENT DOCUMENTS

| | | | |
|---|---|---|---|
| 3,727,783 | 4/1973 | Carmichael | 215/1 C |
| 3,870,181 | 3/1975 | Sincock | 215/1 C |
| 3,881,621 | 5/1975 | Adomaitis | 215/1 C |
| 3,934,743 | 1/1976 | McChesny et al. | 215/1 C |
| 4,134,510 | 1/1979 | Chang | 220/70 X |
| 4,151,249 | 4/1979 | Lee | 215/1 C X |
| 4,249,666 | 2/1981 | Hubert et al. | 215/1 C |
| 4,249,667 | 2/1981 | Pocock et al. | 215/1 C |
| 4,294,366 | 10/1981 | Chang | 215/1 C |
| 4,334,627 | 6/1982 | Krishnakumar et al. | 215/1 C |
| 4,359,165 | 11/1982 | Jakobsen | 215/1 C |
| 4,525,401 | 6/1985 | Pocock et al. | 215/1 C X |
| 4,603,831 | 8/1986 | Krishnakumar et al. | 215/1 C X |
| 4,620,639 | 11/1986 | Yoshino | 220/70 X |
| 4,755,404 | 7/1988 | Collette | 215/1 C X |
| 4,785,948 | 11/1988 | Strassheimer | 215/1 C |

FOREIGN PATENT DOCUMENTS

| | | | |
|---|---|---|---|
| 86/05462 | 9/1986 | PCT Int'l Appl. | 220/70 |
| 2031837 | 4/1980 | United Kingdom | 215/1 C |

Primary Examiner—Sue A. Weaver
Attorney, Agent, or Firm—Harness, Dickey & Pierce

[57] ABSTRACT

An improved preform is disclosed for molding plastic containers having a self-supporting base structure. The preform has a reinforcing section of concentric annular ribs near its closed end. The wall thickness of the preform is increased in the reinforcing section by a plurality having an increasing thickness in a direction toward the closed end of the preform. When blow molded into a final container, these concentric ribs form annular reinforcing ribs on the inner surface of the container base. These ribs are substantially concentric about the longitudinal axis of the container and are of decreasing thickness radially outward from the center. The ribs coact with other reinforcing ribs in the base structure to further increase the strength of the container base. During stretching of the preform prior to blow molding, the concentric ribs act to reduce the stretching of the preform in the reinforcing section thus increasing the wall thickness of the base and thereby increasing the base strength.

13 Claims, 6 Drawing Sheets

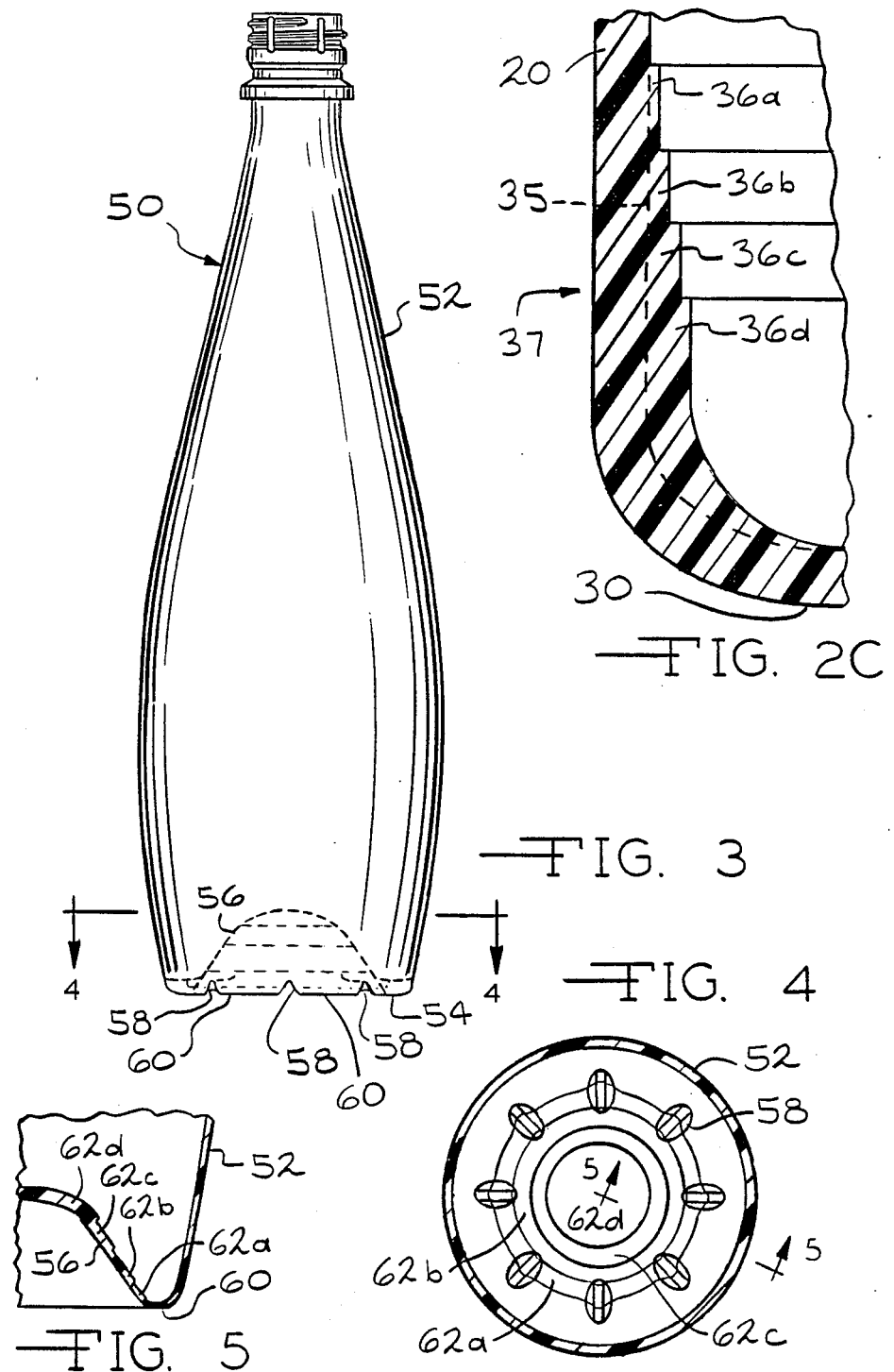

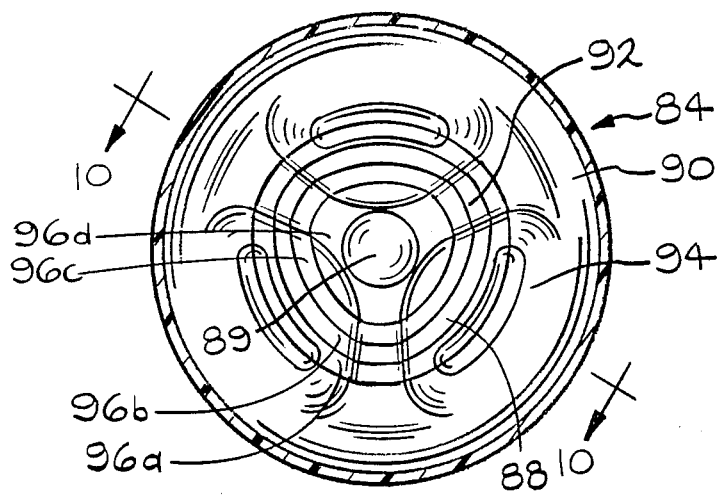
FIG. 9
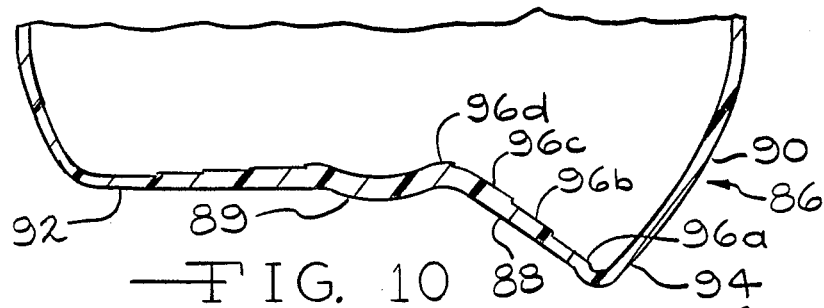
FIG. 10
FIG. 12
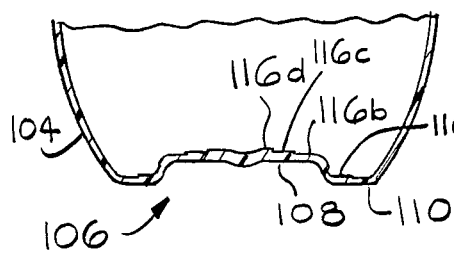
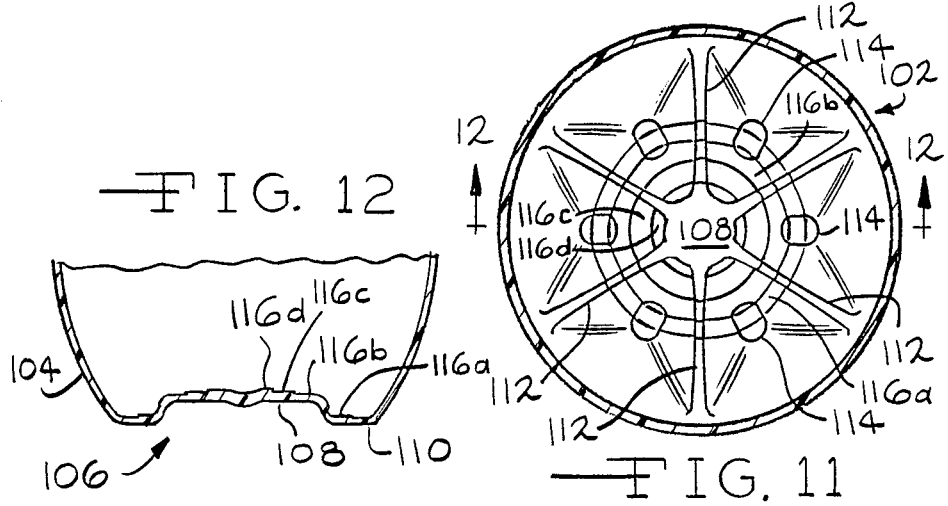
FIG. 11

CONCENTRIC RIBBED PREFORM AND BOTTLE MADE FROM SAME

BACKGROUND OF THE INVENTION

The present invention relates to hollow plastic containers and, more particularly, to blow molded plastic containers with improved self supporting bases.

With the wide acceptance of plastic bottles for packaging carbonated beverages, producers of such containers have developed bottles having self supporting bases. Such a container must be able to withstand the internal pressure necessary to maintain the desired carbonation. Such a pressure is on the order of 75 psi.

One such bottle, with a self supporting base, is disclosed in U.S. Pat. No. 4,261,948, which has become known as the "Supa" bottle. This patent discloses a method of increasing the wall thickness of the bottom structure of the container. This is accomplished by incorporating into the injection molded preform a plurality of longitudinal ribs on the inner surface of the preform near its closed end. When blow molded into the final container shape, these longitudinal ribs form radially outward directed ribs on the inner surface of the container base. The ribs, in addition to adding material to the base, also act to reduce the stretching of the preform and thinning of the wall in the bottom portion, thus providing a base with a thicker base structure than identical containers without a ribbed preform.

The "Supa" preform, however, is only useful in blow molding bottles having a champagne type bottom with an inward depression or a cone in the bottom of the bottle. It is not useful for bottles with a radially ribbed or footed base structure. In addition, the reheat processing parameters for the "Supa" preform must be carefully controlled within a narrow range in order to obtain the stretching and bending of the preform wall necessary to form a supporting base on the bottle. As a result of this narrow range, the scrap rate with the "Supa" preforms can be high.

Accordingly it is an object of this invention to provide a preform which can be used to increase the base wall thickness in a self supporting bottle and which can be used with a variety of bottle base configurations such as footed or hollow radial ribbed bases as well as champagne bottle bases.

It is another object of this invention to provide a preform which can be molded with less restrictive reheat processing parameters.

It is a feature of this invention to provide a preform having a plurality of concentric annular reinforcing ribs on the inner surface of the preform near its base which when blow molded forms substantially concentric annular reinforcing ribs on the inner surface of the bottle base. This feature results in a base of decreasing wall thickness in a radially outward direction which is advantageous because it maximizes plastic in the center of the base where it is required for strength and decreases the thickness of the preform in the area which requires the most stretching and bending to form the feet or legs in the base.

It is an advantage of this invention that the annular reinforcing ribs can network with other reinforcing ribs in the base structure to further increase the base strength.

SUMMARY OF THE INVENTION

The hollow preform of this invention is molded with a reinforcing section near the base of the preform. The wall thickness of the preform is increased in the reinforcing section. The increased wall thickness is accomplished by molding the preform with a plurality of concentric annular ribs on the inner side of the preform adjacent its closed end. The ribs are of increasing thickness from the open end of the preform to the closed end. The ribs are molded in the preform by machining a plurality of annular portions of decreasing diameter in the core rod on which the preforms are molded. The decreasing diameter portions can be turned onto the core rod during the manufacture of the core rod. In contrast, the core rod used to produce the "Supa" preform must be machined in two stages, first turning the core rod and then machining the longitudinal grooves to form the ribs in the preform.

When the preform is blow molded to form the finished container, the concentric ribs in the preform form a plurality of annular reinforcing ribs substantially concentric about the longitudinal axis of the bottle on the inner surface of the base portion of the bottle. These ribs cause a decrease in the thickness of the bottle base in a direction radially outward from the center of the base structure. These annular reinforcing ribs can be used in bottles having a champagne type base structure, a hollow radial ribbed base structure, or a footed base structure. Thus the preform of the present invention is useful with a wider variety of bottle configurations than is the "Supa" preform.

The annular ribs will interact with other rib structures in the bottle base to improve the physical strength of the base structure. With the improved base strength due to interaction of the ribs, the wall thickness in the base can be reduced to produce a bottle with equal strength to previous bottles or the bottle side wall can be increased to improve the shelf life of the container.

Further objects, features and advantages of the invention will become apparent from a consideration of the following description and the appended claims when taken in connection with the accompanying drawings.

BRIEF DESCRIPTION OF THE DRAWINGS

FIG. 2C is an enlarged view of a portion of the preform according to this invention;

FIG. 3 is a side view of a bottle blow molded from a preform having concentric annular ribs according to this invention;

FIG. 4 is a sectional view as seen from substantially the line 4—4 of FIG. 3;

FIG. 5 is a sectional view as seen from substantially the line 5—5 of FIG. 4;

FIG. 9 is a bottom view of another bottle blow molded from a preform having concentric annular ribs according to this invention;

FIG. 10 is a sectional view as seen from substantially the line 10—10 of FIG. 9;

FIG. 11 is a bottom view of yet another bottle blow molded from a preform having concentric annular ribs according to this invention;

FIG. 12 is a sectional view as seen from substantially the line 12—12 of FIG. 11;

DETAILED DESCRIPTION OF THE DRAWINGS

Figure 1:
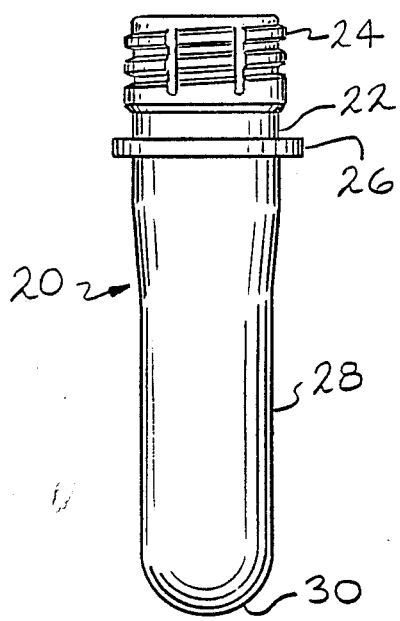
FIG. 1 is a side view of a injection molded preform for use in forming blow molded plastic containers.

Many injection blow molded bottles are made in a two stage process in which in the first stage a hollow preform is injection molded. In the second stage, the preform is re-heated and blow molded to form the finished bottle. A preform in such a two stage process is shown in FIG. 1 and indicated generally at 20. The preform includes an open neck portion 22 having threads 24 which are used to secure the bottle closure cap. Immediately below neck portion 22 is a conventional outwardly extending annular neck ring 26. Extending below neck ring 26 is a hollow tubular body 28 which is closed at its lower end with a hemispherical base 30.

Figure 2:
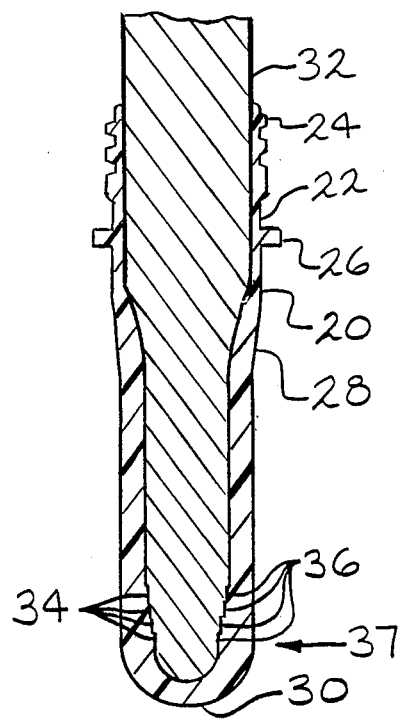
FIG. 2 is a section view of the preform of FIG. 1 and core rod used in injection molding the preform showing the concentric annular ribs at the closed end of the preform.

FIG. 2 shows a cross section of the preform 20 and the core rod 32 used to injection mold the preform 20. Core rod 32 includes at its lower end a plurality of successively decreasing diameter portions 34. Decreasing diameter portions 34 are used to mold a plurality of concentric annular reinforcing ribs 36 in the inner wall of preform 20 forming a reinforcing section 37 in the preform in FIG. 2. Ribs 36 decrease in wall thickness in a direction away from the hemispherical bottom 30 of the preform.

Figure 2A:
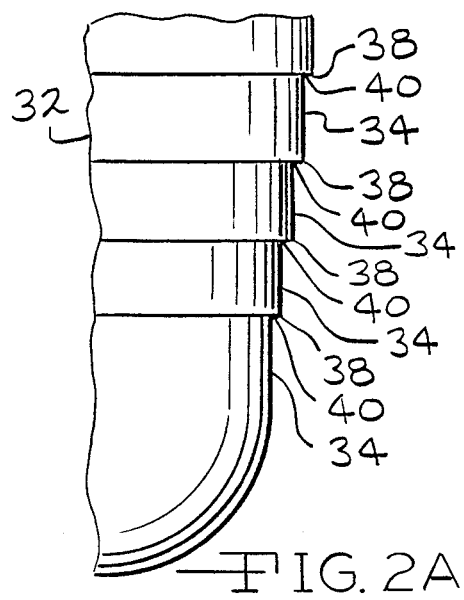
FIG. 2A is an enlarged partial side view of the lower end of a the core rod of FIG. 2 used to injection mold the preform according to this invention.
Figure 2B:
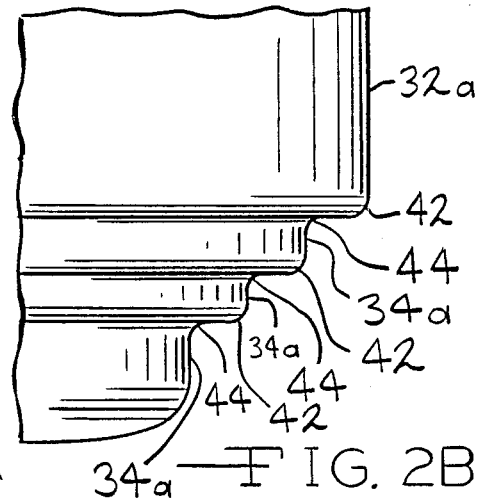
FIG. 2B is an enlarged partial side view of the lower end of a core rod similar to the core rod of FIG. 2A used to injection mold the preform according to this invention.

FIG. 2A is an enlarged view of the portion of core rod 32 used to form the reinforcing section 37 of the preform. The decreasing diameter portions 34 are formed using square corners at 38 and 40 at each end of decreasing diameter portions 34. An alternative profile of core rod 32d is shown in FIG. 2B in which the corners 42 and 44 of the decreasing diameter portions 34a are curved rather than square.

FIG. 2C shows an enlarged view of the reinforcing section 37 of preform 20. Broken line 35 represents the location of the preform inner surface without the reinforcing ribs 36. Ribs 36a–36d are of increasing thickness toward the base of the preform. The rib 36d is gradually tapered such that the wall thickness at the center of base 30 is approximately the same as the wall thickness of the preform above the reinforcing section 37. To avoid increasing the preform weight with the addition of the ribs 36, the wall thickness of the preform tubular body 28 can be reduced. As a result, bottles produced with a preform having ribs 36 have the same weight as bottles produced from a preform without the ribs 36.

Concentric ribs 36 in the lower end of the preform reduce the thinning of the preform in the reinforcing section 37 when the preform is stretched prior to blow molding, resulting in additional material in the base portion of the bottle. Because the center of base 30 does not thin during stretching, there is no need to maintain the thickness of rib 36d in base 30 as is discussed above. The added material in the base structure increases the strength of the bottle base to prevent eversion of the base due to internal carbonation pressures. In addition, the processing parameters for reheating the preform are not as narrowly defined as with the "Supa" base preform, thus reducing the scrap rate.

FIGS. 3-5 show a bottle 50 blow molded using a preform with concentric ribs 36a–36d. The bottle includes a generally cylindrical side wall 52 which is closed at its lower end by a generally circular bottom wall 54. Bottom wall 54 includes an upwardly and inwardly directed concave center portion 56 and a plurality of inverted hollow V-shaped radial reinforcing grooves 58 on the bottom surface between the cylindrical side wall 52 and the concave portion 56. Reinforcing grooves 58 divide the outer lower edge of the bottom portion into a plurality of feet 60 between the reinforcing grooves 58. Ribs 36a–36d in preform 20 result in the formation of annular reinforcing ribs 62a–62d formed on the inner side of the bottom wall 54. Reinforcing ribs 62 are substantially concentric with the longitudinal axis of the bottle 50 and are of decreasing thickness radially outward from the center of the bottle.

Figure 6:
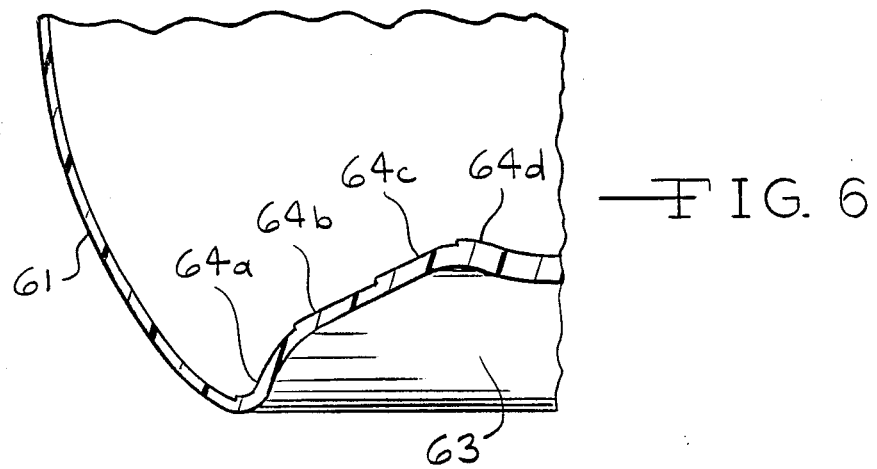
FIG. 6 is a partial sectional view of a bottle base having concentric annular ribs according to this invention.

FIG. 6 shows a section of a bottle having a side wall 61 and upward concave base 63 similar to a champagne bottle. The concentric ribs 36a–36d of the preform form concentric annular reinforcing ribs 64a–64d on the inner surface of base 63. Ribs 64a–64d are generally concentric about the longitudinal axis of the bottle and are of decreasing thickness radially outward.

Figure 7:
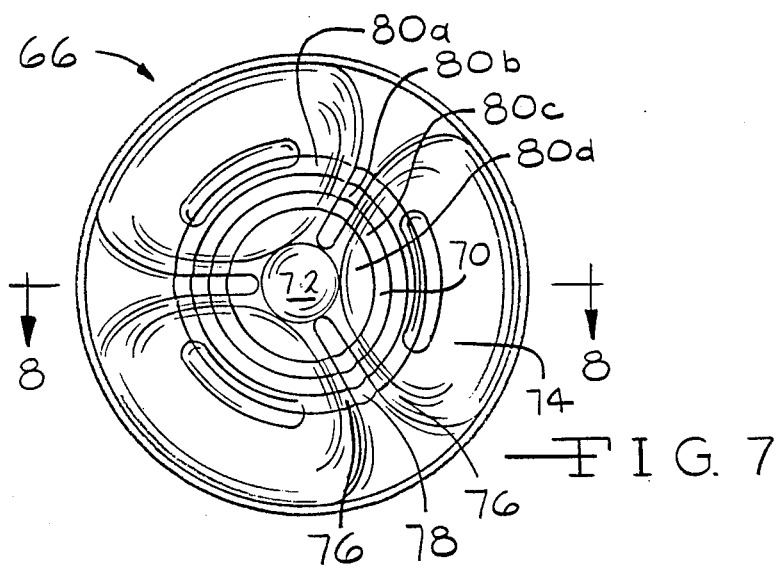
FIG. 7 is a bottom view of another bottle blow molded from a preform having concentric annular ribs according to this invention.
Figure 8:
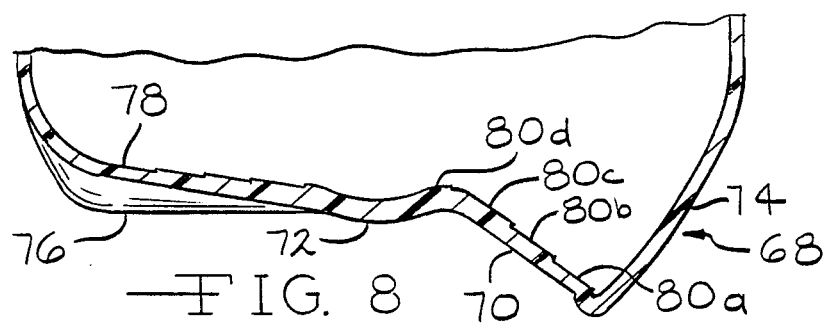
FIG. 8 is a sectional view as seen from substantially the line 8—8 of FIG. 7.

FIGS. 7 and 8 illustrate a bottle 66 similar to that disclosed in copending patent application, Ser. No. 219,732 filed July 15, 1988 the specification of which is incorporated herein by reference. Bottle 66 includes a base 68 having a conical inner wall 70 with apex 72 at the center thereof. A convex outer wall 74 of annular shape surrounds the inner wall 70 and merges therewith at the lower most part of the bottle. The upper end of outer wall 74 is merged with the lower end of the bottle side wall. Extending radially outward from the apex 72 are three hollow ribs 76 which merge with the convex outer wall 74. Ribs 76 divide the conical inner wall 70 and the convex outer wall 74 into three circumferentially spaced hollow feet extending below the apex 72. Projecting upwardly and inwardly from the flat ribs 76 are hollow inverted U-shaped reinforcing ribs 78 which extend from the apex 72 and merge with the convex outer wall 74 at a point axially above the merger of flat ribs 76 with outer wall 74.

As a result of the reinforcing ribs 36a–36d in the preform used to blow mold the bottle 66, the inner surface of the base 68 includes a plurality of annular reinforcing ribs 80a–80d. Again, ribs 80 are substantially concentric with the longitudinal axis of the bottle and are decreasing in thickness radially outward. Ribs 80a–80d network with the flat ribs 76 and U-shaped ribs 78 to further increase the physical strength of the bottle base.

Another bottle 84 is illustrated in FIGS. 9 and 10 which is similar to the bottle shown in FIGS. 7 and 8 and is also disclosed in patent application, Ser. No. 219,732, now U.S. Pat. No. 4,867,323. This bottle has a base 86 which has a conical inner wall 88 and an apex 89 at the center thereof. A convex outer wall 90 of annular shape surrounds the inner wall 88 and merges therewith at the lower most part of the bottle. The upper end of outer wall 90 merges with the bottle side wall. Extending radially outward from the apex 89 are three hollow ribs 92 which merge with outer wall 90. Ribs 92 divide the convex outer wall 90 and conical inner wall 88 into three circumferentially spaced hollow feet 94.

The ribs 36a–36d in the preform result in annular reinforcing ribs 96a–96d and on the inner surface of the base 86. Again, these ribs 96a–96d are substantially concentric with the longitudinal axis of the bottle and are of decreasing thickness radially outward.

Another bottle 102 is shown in FIGS. 11 and 12 blow molded from a preform having concentric ribs 36a–36d. Bottle 102 has a base comprised of convex outer wall 104 and bottom wall 106. Bottom wall 106 includes a concave central portion 108 and a generally horizontal outer portion 110. Projecting upwardly and radially outward from central portion 108 to outer wall 104 are six hollow inverted U-shaped ribs 112 which divide the outer portion 110 of the bottom wall into circumferentially spaced feet 114.

The concentric ribs 36a–36d of the preform form annular reinforcing ribs 116a–116d on the inner surface of the bottom wall 106. Ribs 116a–116d are substantially concentric about the longitudinal axis of the bottle and having decreasing thickness radially outward.

Figure 13:
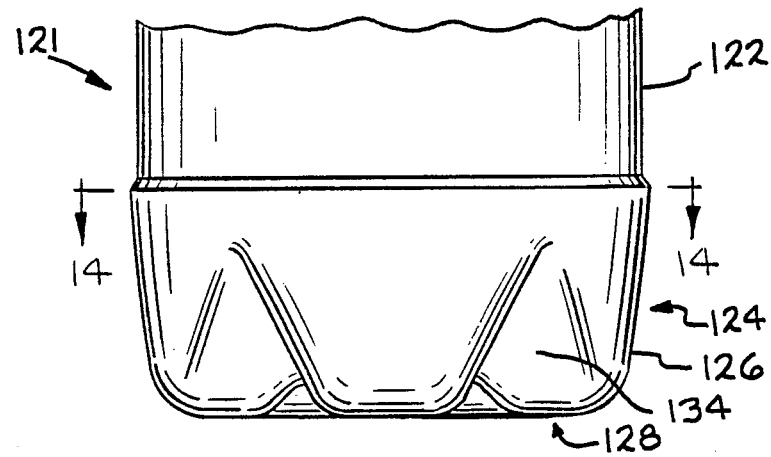
FIG. 13 is a partial side view of a bottle blow molded from a preform having concentric annular ribs according to this invention.
Figure 15:
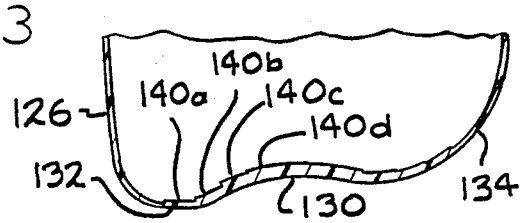
FIG. 15 is a sectional view as seen from substantially the line 15—15 of FIG. 14.
Figure 14:
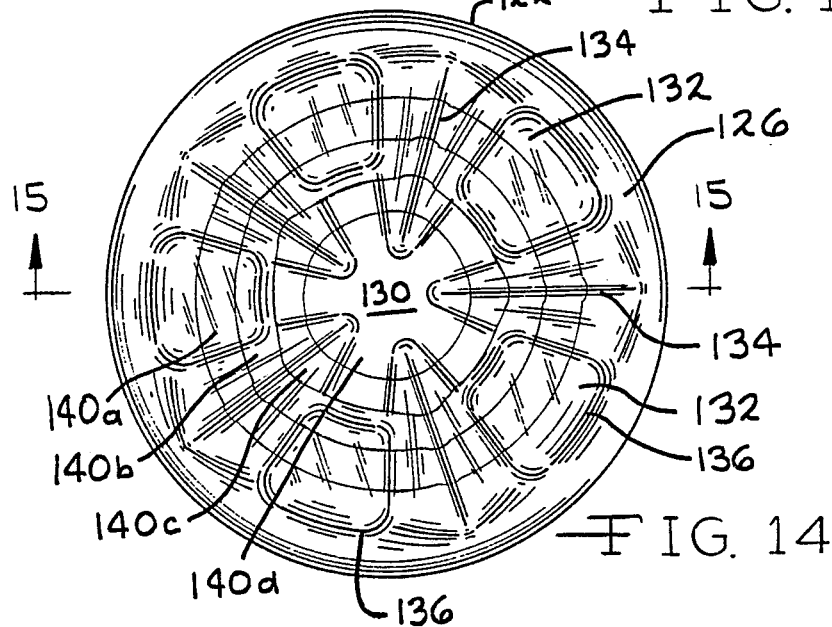
FIG. 14 is a sectional view as seen from substantially the line 14—14 of FIG. 13.

Another bottle 121 is disclosed in FIGS. 13–15 which is similar to the bottle disclosed in copending patent application, Ser. No. 209,084, filed June 17, 1988, now continuation-in-part application entitled "Blow Molded One-Piece Bottle, filed Jan. 20, 1989, Ser. No. 299,751, now U.S. Pat. No. 4,865,206 the specification of which is incorporated herein by reference to the extent that the subject matter disclosed in the continuation-in-part application is identical to the subject matter of the parent application. Bottle 121 includes a generally cylindrical side wall 122 and a base 124. The base 124 includes a frusto-conical outer wall 126 and a bottom wall 128. Bottom wall 128 has a generally horizontal outer portion 132 and a concave central portion 130. Five hollow inverted U-shaped convex ribs 134 extend from the central portion 130 radially outward and upward to the outer wall 126. Ribs 134 divide the outer portion 132 into five circumferentially spaced hollow feet 136. The feet 136 have a flat bottom surface of a generally trapezoidal shape of decreasing width in a direction radially inward.

The ribs 36a–36d of the preform form a plurality of annular reinforcing ribs 140a–140d which are substantially concentric with the longitudinal axis of the bottle and are of decreasing thickness radially outward. Annular ribs 140a–140d interact with U-shaped radial ribs 134 to strengthen the base.

Figure 16:
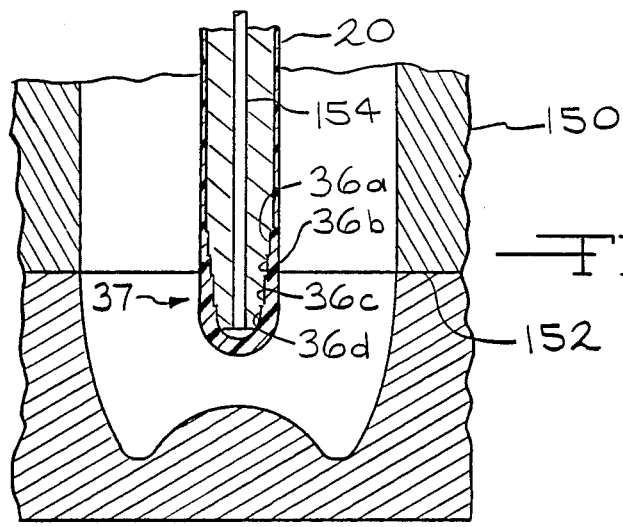
FIG. 16 is a sectional view of a preform according to this invention in position in a blow mold.

FIG. 16 shows a preform 20 with concentric reinforcing ribs 36a–36d. The preform is in position in a two piece blow mold 150 having a parting line 152. The stretch rod 154 has stretched the preform 20. During the stretching of the preform, the concentric ribs 36 act to reduce the thinning of the wall in the reinforcing section 37 of the preform. As a result, the base structure of the finished bottle has a thicker wall than if the same bottle had been blow molded from a preform without ribs 36a–36d. This is accomplished without any modification to the blow mold and only a slight modification to the core rod used in injection molding the preform.

Figure 17:
FIG. 17 is a partial side view of a bottle blow molded from a preform having concentric annular ribs according to this invention.
Figure 18:
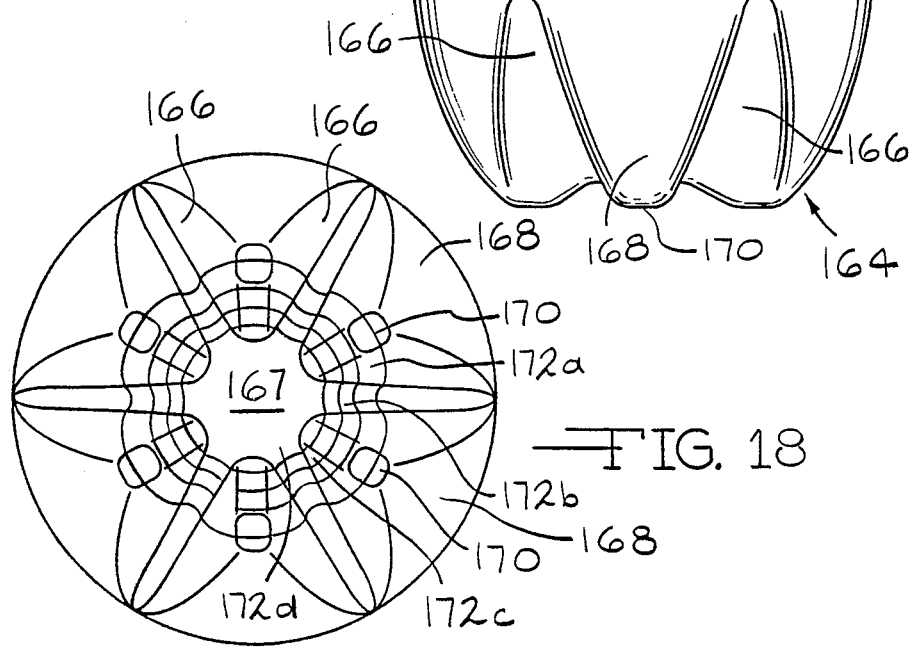
FIG. 18 is a bottom view of the bottle shown in FIG. 17.

FIGS. 17 and 18 show yet another bottle 160 formed with a preform 20 having concentric annular reinforcing ribs 36a–36d. Bottle 160 is similar to the bottle disclosed in U.S. Pat. No. 3,598,270. Bottle 160 includes a tubular body 162 terminating at its lower end with a base structure 164. The base 164 comprises a plurality of meridian wall portions 166 of a common hemisphere having a radius which is approximately equal to that of the tubular body 162. The meridian portions 166 have a downward pole 167 and extend upward from the pole. Outer wall portion 168 defines hollow legs terminating below the meridian portions in circumferentially spaced feet 170 in the lower most plane of the container 160.

The inner surface of the base 164 includes a plurality of annular reinforcing ribs 172a–172d being substantially concentric about the longitudinal axis of the bottle. Reinforcing ribs 172 are of a decreasing thickness radial outward from the center of the base.

It has been shown that the preform 20 having concentric ribs 36 can be used to produce bottles having a variety of base structures. The preform 20 can also be used to blow mold the bottle shown in copending patent applications, Ser. Nos. 208,899 and 209,004 filed June 20, 1988, U.S. Pat. Nos. 4,850,493 and 4,850,494 the specifications of which are herein incorporated by reference. These bottles are similar to the bottle 50 of FIG. 3 in that the bottom wall has an inwardly and upwardly concave portion at its center similar to a champagne bottle. A plurality of hollow inverted U or V-shaped ribs extend radially from the concave center to the outer wall dividing the base into a plurality of feet at the lower most point of the bottle. The annular reinforcing ribs formed on the inner surface of the base by ribs 36a–36d of the preform network with the hollow radial ribs to increase the strength of the base.

While the preforms and bottles illustrated in the drawings contain four ribs, the number of ribs can be varied depending on the size of the bottle and the desired strength required in the bottle base. It is contemplated that the number of ribs can vary from as few as one to as many as ten.

Although not shown in the drawings, it is contemplated that the annular reinforcing ribs on the container base need not be circumferentially continuous. The core rod 32 can be machined with one or more narrow longitudinal projections such that the preform 20 is molded with a longitudinal groove through the reinforcing section 37. The preform wall thickness at the location of this groove will be the same as the wall thickness of preform tubular body 28. When blow molded into a bottle, these grooves will form grooves in the bottle base having a wall thickness less than the wall thickness of the annular ribs. As used in the claims, the term substantially continuous ribs means ribs which are continu-

What is claimed is:

1. A preform for blow molding plastic containers comprising:
   a hollow tubular body having an upright tubular wall with an inner surface, said hollow body having an open top end and a closed bottom end forming the base of said preform, said base disposed below said tubular wall and extending radially inwardly therefrom; and
   said tubular wall having a reinforcing section immediately adjacent said base having a plurality of substantially concentric annular ribs on said tubular wall inner surface, said ribs having a wall thickness as measured in a direction radially of said tubular body which is greater than the wall thickness of the preceding rib as the ribs progress toward the base and said ribs being adjacent one another in an axially direction wherein the radial wall thickness of said tubular body increases in a direction toward said base relative to the wall thickness of said tubular body above said reinforcing section, the wall thickness in said reinforcing section being substantially uniform in a circumferential direction.

2. The preform of claim 1 wherein said plurality is from two to ten.

3. A plastic container comprising an upright hollow body having an upright longitudinal axis, said body having a tubular side wall merging at its lower end with a base structure, said base structure comprising:
   a bottom wall having an upwardly facing inner surface;
   a plurality of substantially continuous annular reinforcing ribs on said inner surface, said ribs being generally concentric about said axis and being of increased thickness relative to said tubular side wall, the wall thickness of each rib being greater than the wall thickness of the preceding rib as the ribs progress toward the axis and said ribs being adjacent one another in a radial direction resulting in an increasing wall thickness of said bottom wall in a direction radially inwardly toward said axis.

4. The container of claim 3 wherein said plurality is from two to ten.

5. The container of claim 3 further comprising:
   an upwardly and inwardly concave portion centrally of said bottom wall.

6. The container of claim 5 further comprising a plurality of reinforcing grooves extending radially from said concave portion to said side wall.

7. A plastic container comprising an upright hollow body having an upright longitudinal axis, said body having a tubular side wall merging at its lower end with a base structure, said base structure comprising:
   an upwardly concave central portion having an upwardly facing inner surface;
   an outer wall of annular shape surrounding said central portion and merging therewith at the lower edge of said outer wall, said outer wall also merging with said lower end of said side wall;
   a predetermined number of substantially continuous annular reinforcing ribs on said inner surface, said ribs being generally concentric about said axis and being of increased thickness relative to said tubular side wall, the wall thickness of each rib being greater than the wall thickness of the preceding rib as the ribs progress toward the axis resulting in an increasing wall thickness of said concave portion in a direction radially inwardly toward said axis.

8. A plastic container comprising an upright hollow body having an upright longitudinal axis, said body having a tubular side wall merging at its lower end with a base structure, said base structure comprising:
   an upwardly concave central portion having an upwardly facing inner surface;
   an outer wall of annular shape surrounding said central portion and merging therewith, said outer wall also merging with said lower end of said side wall;
   a predetermined number of substantially continuous annular reinforcing ribs on said inner surface, said ribs being generally concentric about said axis and being of increased thickness, relative to said tubular side wall, the wall thickness of each rib being greater than the wall thickness of the preceding rib as the ribs progress toward the axis resulting in an increasing wall thickness of said concave portion in a direction radially inwardly toward said axis;
   a plurality of hollow ribs extending radially from said central portion to said outer wall and merging therewith, said radial ribs dividing said outer wall into a plurality of circumferentially spaced feet projecting downward below said radial ribs.

9. The container of claim 8 wherein said radial ribs are substantially horizontal.

10. The container of claim 8 wherein said radial ribs curve upwardly in a radially outward direction.

11. A plastic container comprising an upright hollow body having an upright longitudinal axis, said body having a tubular side wall merging at its lower end in a base structure, said base structure comprising:
    an outer wall extending downwardly and inwardly from said side wall;
    a bottom wall having an upwardly facing inner surface, said bottom wall having a generally horizontal outer portion and a central portion, said horizontal outer portion merging with the lower end of said outer wall;
    a predetermined number of substantially continuous annular reinforcing ribs on said inner surface, said ribs being generally concentric about said axis and being of increased thickness relative to said tubular side wall, the wall thickness of each rib being greater than the wall thickness of the preceding rib as the ribs progress toward the axis resulting in an increasing wall thickness of said bottom wall in a direction radially inwardly toward said axis; and
    a plurality of upwardly projecting hollow ribs extending radially from said central potion and merging with said outer wall, said ribs dividing said generally horizontal outer portion of said bottom wall into a plurality of circumferentially spaced hollow feet having flat bottom surfaces spaced with respect to said axis.

12. The container of claim 11 wherein said radially extending ribs curve upwardly in a radially outward direction.

13. A plastic container comprising an upright hollow body having and upright longitudinal axis, said body having a tubular side wall merging at its lower end with a base structure having an upwardly facing inner surface, said base structure comprising:

a plurality of meridian wall portions of a common hemisphere having a radius which is approximately equal to that of said tubular side wall, said meridian portions having a downward pole and extending upward from said pole;

an outer wall portion between said meridian portions defining hollow legs terminating below said meridian portions in circumferentially spaced feet; and a predetermined number of substantially continuous annular reinforcing ribs on said inner surface, said ribs being generally concentric about said axis and being of increased thickness relative to said tubular side wall, the wall thickness of each rib being greater than the wall thickness of the preceding rib as the ribs progress toward the axis resulting in an increasing wall thickness of said base structure in a direction radially inwardly toward said axis.

* * * * *